Dec. 15, 1964  D. K. SLOSBERG  3,161,556
METHOD OF MAKING PLASTIC TERRAZZO SHEET MATERIAL
Filed Aug. 1, 1961
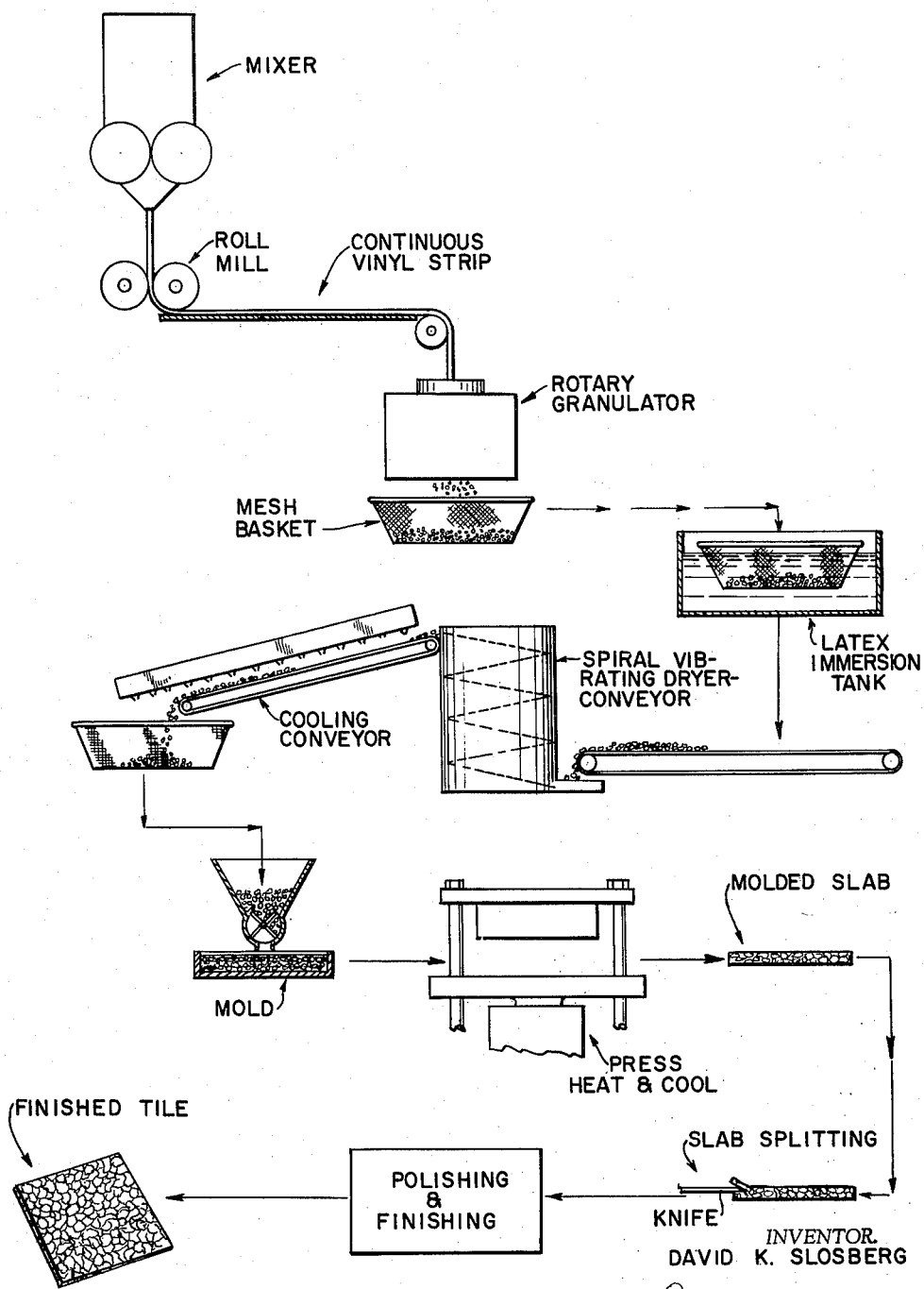
INVENTOR.
DAVID K. SLOSBERG
BY
ATTORNEY United States Patent Office 3,161,556
Patented Dec. 15, 1964

3,161,556
METHOD OF MAKING PLASTIC TERRAZZO
SHEET MATERIAL
David K. Slosberg, Yardley, Pa., assignor to Bonafide
Mills, Inc., Winthrop, Maine, a corporation of Maine
Filed Aug. 1, 1961, Ser. No. 128,373
1 Claim. (Cl. 156—278)

This invention relates to a novel method of producing a plastic sheet having the appearance of terrazzo.

Terrazzo, which consists of marble chips in randomly distributed patterns, is well known for its beautiful appearance. Many attempts have been made to simulate these patterns using synthetic processes and plastic chips. However, the irregularity of the pattern of terrazzo and the striking cellular delineation of each marble chip has not been heretofore achieved. Instead of standing out as irregular bodies scattered randomly throughout the body of the material, the plastic chips appeared to blend with each other thereby preventing any faithful simulation of terrazzo.

It is therefore an object of the present invention to provide a novel terrazzo-like plastic sheet which effectively simulates the appearance of terrazzo.

Another object of the present invention is to provide a novel method for producing a terrazzo-like plastic sheet having the cellular grain boundary or etched appearance of terrazzo.

A further object of the present invention is to provide a terrazzo-like plastic sheet in which the cellular boundaries between the chips extends in depth throughout the sheet from one side to the other.

Still another object of the present invention is to provide a terrazzo-like plastic sheet having great resiliency and capable of being provided with highly decorative colors. A feature of the present invention is the provision of a plastic sheet in which each of the plastic chips stands out and appears to be separately bonded to its adjacent chips.

A further feature of the present invention is the provision of a terrazzo-like plastic sheet which is very durable but is nevertheless not costly to manufacture nor difficult to produce.

Other objects and advantages appear in the following description and specification.

The drawing discloses the means utilized in the step-by-step process for bearing the terrazzo-like tile according to the present invention.

In providing the plastic sheet of the present invention, the initial step comprises producing irregular sized chips which contain polyvinyl chloride resins.

It is not necessary, in order to achieve the advantages of the present invention, to substantially deviate from the heretofore known method of initially producing the basic plastic chip itself. This method includes the steps of mixing the ingredients as, for example, the polyvinyl chloride resins, pigments and other adjuvants, as desired in the presence of heat. The materials are formed into continuous sheets by processing through rollers. Irregularly shaped solid bodies or chips are then produced from the sheets.

Conventionally, after the plastic chips were produced, selected colors and sizes thereof were randomly distributed in a mold and cured to provide the so-called imitation terrazzo material.

According to the present invention, however, the plastic chips are subjected to a new and novel process which ultimately results in the provision of highly desirable grain boundary or etched effects throughout the plastic sheet. The chips are separated from each other by partitions of irregular shape. It has been found that this appearance of natural terrazzo is imparted to the synthetic sheet by providing a coating over substantially the entire surface area of each of the chips prior to molding them together.

The compatibility of the coating material with the ingredients of the plastic chips is such that a bond therebetween, sufficient to make the sheet entirely integral, will occur under molding conditions of heat and pressure. However, in further accordance with this invention, the coating material is of such nature that in the final product it resembles a honeycomb of cells whereby each chip in the sheet appears separated from its adjacent chips and provides a completely delineating etched effect.

Various latices have been discovered to be effective applicable ingredients in coating compositions of the present invention. A latex is usually a milky white liquid which is a colloidal dispersion of resins in water. In vinyl latices, resin particles are spherical and usually negatively charged. Particle size may vary from 0.1 micron to 1 micron—normally will be about .25 micron. Particles exhibit brownian movement. Conventionally available latices are usually protected against mechanical and chemical shock by small additions of soap or other emulsifiers.

The types of latices which are applicable in carrying out the method of the present invention are polyvinyl chloride (relative viscosity of resin in 1% cyclohexanone solution 1.50 to 3.00); polyvinyl chloride plasticized by latex with di-octyl phthalate; polyvinyl chloride-polyvinyl acetate copolymers (intrinsic viscosity .53 to .79 in cyclohexanone at 20° C.); polyvinyl chloride copolymerized with ethyl acrylate, methyl acrylate and similar materials; polyvinyl chloride copolymerized with vinylidene chloride (specific viscosity .38–.42 in 0.4% solution in nitrobenzene); polymers of acrylic esters; butadiene-acrylonitrile polymers and butadiene-acrylonitrile copolymerized with styrene.

The preferred latex is polyvinyl chloride latex which may be modified with plasticizers, compatible latices, stabilizers, lubricants, fillers, pigments, thickening agents and anti-foam agents.

Exemplary of a plasticizer is dioctyl phthalate having the following composition:

| | Parts by weight |
|---|---|
| Dioctyl phthalate | 75 |
| Water | 22 |
| Alkyl phenyl polyethylene glycol ether | 3 |
| | 100 |

Other plasticizers may be employed which are taken from dialkyl phthalates in which the alkyl esterifying radical contains 4 to 10 carbon atoms; esters of dicarboxylic acids such as azelic acid, sebacic acid, adipic acid or the like, the hydrocarbon esters of phosphoric acid; and the epoxy polymers, such as epoxidized soybean oil. In particular, other plasticizers are butyl benzyl phthalate, butyl octyl phthalate, di-isodecyl phthalate, tri-cresyl phosphate and tri-octyl phosphate.

In order to prevent adverse reactions such as oxidation from taking place, the coating compositions may also contain stabilizers, as for example, the barium, zinc, lead, tin and cadmium salts of fatty acids containing 6 to 24 carbon atoms; dibutyl tin dilaurate; tin mercaptides and dibasic lead phosphite.

To facilitate the application of the coating to the chips a lubricant may be incorporated with the coating material. Lubricants which may be used include paraffin wax, stearic acid, stearates of lead, calcium, zinc and aluminum, coal tar resins, wood resin derivatives and others. The lubricant is dissolved in the plasticizer.

If colors are desired, the coating material may also be pigmented with either an organic or inorganic pigment of any desired color.

For use on certain plastic chips, filler ingredients may be added to the coating. These increments include for example, calcium carbonate, calcium silicate, magnesium silicate, aluminum silicate and others. These ingredients can be added directly to the latex and dispersed by a pebble mill or other means. They can also be predispersed in water and added. For example:

| | Parts by weight |
|---|---|
| Calcium silicate | 60 |
| Water | 38 |
| Alkyl aryl polyether alcohol | 2 |
| | 100 |

The thickening agents may be sodium polyacrylate, alginates, caseinates or cellulose derivatives which may be added directly to the latex.

The anti-foam agents may be 2-ethyl hexanol, silicone oils or tributyl phosphate.

In the following an example is provided which is set forth in order to provide further elucidation of the present invention. The example is merely given by way of illustration and is not to be deemed as limiting the invention.

*Example*

Latex blend:

| | Parts by weight |
|---|---|
| Polyvinyl chloride latex (50% solids—relative viscosity of resin 2.50 in 1% cyclohexanone) | 71 |
| Dioctyl phthalate emulsion (75% non-volatile) | 16.5 |
| Dibutyl tin dilaurate emulsion (75% non-volatile) | 1.5 |
| Sodium polyacrylate solution (10% non-volatile) | 11 |
| | 100 |

Water is the volatile ingredient and is added in a quantity to give sufficient consistency. Additionally, pigment is added as required.

The plastic chips are coated with the above latex blend in a ribbon blender. The latex mix is poured into a blender loaded with chips and within a short time each chip receives a uniform coating. The amount of latex blend employed in this example is 10% of the total weight of the mixture. The amount of latex blend may vary so that a quantity of from 2% to 50% of the total weight may be employed.

Other methods for coating the plastic chips may be employed. For instance the plastic chips may be spray coated. This may be accomplished by employing fixed spray nozzles mounted over a vibrating conveyor on which the chips are tumbled in order to insure a complete covering on each chip.

Another alternative method for coating would be actual immersion of the chips into a latex bath. This may be done by the use of a mesh basket to hold the plastic chips or a more elaborate mesh conveyor arrangement may be used to run chips through a latex bath.

As a matter of fact, the coating methods may be combined, if desired. Formulation of the latex blend would of necessity be modified by the equipment used. In spray coating a thickening agent would be eliminated and an effective anti-foam agent would be added.

The plastic chips may be used in a hot condition. In other words, they may be employed directly after being granulated in a normal operation. When employing hot plastic chips, the latex bath or spray serves as a cooling medium. At the same time, the residual heat in the plastic chips would act as a vaporizing agent for the water in the latex coating. This insures the formation of a tough, well cured latex coating on the chips, therefore, avoiding some other difficult operations needed to perfect the coating.

It will be appreciated that it is necessary to remove the water from the latex so that a strong bond is achieved. One manner is to employ tray drying techniques in batch ovens. More elaborate versions of this would be the use of continuous oven conveyor driers. Vacuum driers may also be used. It can be done in the pressing operation, more about which will be stated below, by lengthening the normal press cycle and "bumping" the press to relieve vapor pressure. This is accomplished by positioning the mold in a press under pressure at 1000 p.s.i. at 350° F. for five minutes. The press is then opened for 30 seconds, then closed for normal press cycle. Of course, some if not all of the water can be eliminated by employing hot plastic chips as indicated in the above.

The plastic chips which are provided with the coating composition are then molded or cored. This operation takes place under heat and pressure conditions sufficient to fuse both the chips and the coating material, thereby producing an integral plastic sheet of the desired thickness.

The molding conditions may vary in heat from 250° to 350° F., and from a pressure of about 50 pounds per square inch in, for example, a continuous curing operation to 3,000 pounds per square inch in, for example, a hydraulic press operation. The pressure also depends upon the type of compound and the temperature conditions used in the molding operation.

To produce a sheet of ½ inch thickness, the molding operation takes place in about 5 to 7 minutes under pressure of about 1500 pounds per square inch, and heat of 320° F.

The type of chips employed, the coating composition, the work area conditions and the desired thickness of the resultant sheet determine the molding factors. When the chips and the coating composition are fused, there is provided an integral plastic sheet.

The resultant sheet has an outward appearance of terrazzo. The faithful simulation of terrazzo becomes even more apparent after the outermost surface of the sheet is removed when the details of the honeycomb of cells provided by the coating material around the interfitting chips are further revealed. This result is accomplished by, for example, a sanding operation on the surface of the sheet or the surface may be removed by knife slitters to expose the inner portions.

If desired, the thickness of the sheet or slab may be reduced by cutting operations. In any event, the portion of the sheet exposed as hereinbefore set forth is thereafter polished.

A sheet which very effectively simulates terrazzo is then presented, having, as it does, the etched effect provided by the honeycomb of cells whose partitions extend in depth from one side of the sheet to the other. The sheet may then be processed as to the size necessary for its ultimate use, as for example, floor tile, wall tile, table tops, or for any other desired purpose.

To summarize the foregoing method for accomplishing the finished tile according to the present invention is disclosed for exemplary purposes in the accompanying drawing. As hereinbefore disclosed the ingredients such as polyvinyl chloride resins, pigments, etc., are mixed in a mixer and are passed through a roll mill to form into a continuous vinyl strip. The strip is fed into a rotary granulator and dissected into irregularly shaped chips which drop into a mesh basket. The mesh basket is immersed into a tank filled with latex material. As indicated above, the latex coating may, of course, be applied in other ways. Thereafter, the coated chips are conveyed onto a spiral vibrating dryer conveyor and are then cooled either with or without the aid of a cooling conveyor. The coated chips are then placed into a mold and are molded in the presence of heat and pressure to produce a slab. The slab is then preferably slit to remove the outer surface and polished and finished to produce the tile of the present invention.

While the invention and the compositions and methods of application have been described in great detail, it will be understood that scope of the invention is not to be considered in any way limited thereby. Variations and modifications may therefore be made without departing from the spirit of the invention or the scope of the appended claim.

What is claimed is:

The method of producing a plastic sheet having a surface which resembles teerrazzo in appearance, which comprises the steps of covering solid chips of a material comprising a vinyl polymer, while said chips are in a hot condition, with a thin coating of a water containing latex of a vinyl compound, whereby water in said latex is evaporated by the residual heat in said chips, applying pressure to said coated chips to reduce said coated chips to sheet form, heating said sheet while maintaining it under pressure until said chips under the influence of heat and pressure have been deformed and said chips and said coating have bonded together to form an integrated substantially self-supporting sheet.

References Cited in the file of this patent

UNITED STATES PATENTS

| | | |
|---|---|---|
| 2,775,994 | Rowe | Jan. 1, 1957 |
| 2,805,974 | Brucker | Sept. 10, 1957 |
| 2,888,975 | Benedict | June 2, 1959 |
| 2,987,104 | Benedict | June 6, 1961 |
| 3,002,309 | Snyder | Oct. 3, 1961 |
| 3,017,714 | Slosberg et al. | Jan. 23, 1962 |
| 3,041,193 | Hamway et al. | June 26, 1962 |
| 3,056,224 | Almy et al. | Oct. 2, 1962 |

FOREIGN PATENTS

| | | |
|---|---|---|
| 686,415 | Great Britain | Jan. 21, 1953 |